United States Patent
Armanino

(10) Patent No.: US 12,476,892 B2
(45) Date of Patent: Nov. 18, 2025

(54) METHOD AND SYSTEM FOR SELECTING DATA CENTERS BASED ON NETWORK METERING

(71) Applicant: HCL America Inc., Sunnyvale, CA (US)

(72) Inventor: Pablo Martin Armanino, Buenos Aires (AR)

(73) Assignee: HCL America Inc.

( * ) Notice: Subject to any disclaimer, the term of this patent is extended or adjusted under 35 U.S.C. 154(b) by 161 days.

(21) Appl. No.: 17/956,854

(22) Filed: Sep. 30, 2022

(65) Prior Publication Data

US 2024/0113956 A1 Apr. 4, 2024

(51) Int. Cl.
*H04L 43/0894* (2022.01)
*H04L 9/40* (2022.01)
*H04L 43/062* (2022.01)

(52) U.S. Cl.
CPC ........ *H04L 43/0894* (2013.01); *H04L 43/062* (2013.01); *H04L 63/08* (2013.01)

(58) Field of Classification Search
CPC .... H04L 43/0894; H04L 43/062; H04L 63/08
See application file for complete search history.

(56) References Cited

U.S. PATENT DOCUMENTS

| | | | |
|---|---|---|---|
| 7,188,179 B1 * | 3/2007 | Hanson | H04L 12/5692 709/227 |
| 8,891,392 B2 | 11/2014 | Cook et al. | |
| 9,026,661 B2 | 5/2015 | Swildens et al. | |
| 10,749,773 B2 | 8/2020 | Hockett et al. | |
| 10,769,058 B1 * | 9/2020 | Khandelwal | G06F 11/3688 |
| 2009/0210513 A1 * | 8/2009 | Boss | H04L 67/1001 709/219 |
| 2011/0202608 A1 * | 8/2011 | Nassar | G06Q 10/107 709/206 |

(Continued)

FOREIGN PATENT DOCUMENTS

WO 2009111799 A2 9/2009

OTHER PUBLICATIONS

Jake Jarvis, Speed & Ping Tests for Cloud Hosting Providers, on Jun. 9, 2020, GitHub, Inc.

(Continued)

*Primary Examiner* — John A Follansbee
*Assistant Examiner* — Zonghua Du
(74) *Attorney, Agent, or Firm* — Kendal M. Sheets

(57) ABSTRACT

This disclosure relates to method and system for selecting data centers based on network metering. The method includes rendering a user interface to enable a user to select test plan from a plurality of test plans. The method further includes iteratively executing the test plan selected by the user. The iterative execution of each of the at least one test plan includes, for each of the one or more type of data packets, transmitting a plurality of data packets between each of the customer locations and each of the target data centers, and metering a plurality of network parameters corresponding to each of the target data centers. The method further includes generating a test report in response to iterative execution of the test plan, and providing a recommendation of the one or more data centers from the list of target data centers to the user based on the test report.

14 Claims, 9 Drawing Sheets

(56) References Cited

U.S. PATENT DOCUMENTS

| | | | | |
|---|---|---|---|---|
| 2013/0158934 A1* | 6/2013 | Lee | ........................ | H04L 41/22 |
| | | | | 702/122 |
| 2014/0086073 A1* | 3/2014 | Baykal | ................ | H04L 43/0894 |
| | | | | 370/252 |
| 2014/0269386 A1* | 9/2014 | Chu | ..................... | H04L 43/065 |
| | | | | 370/252 |
| 2015/0358225 A1* | 12/2015 | Zawari | ................... | H04L 43/50 |
| | | | | 709/217 |
| 2016/0057077 A1* | 2/2016 | Gomatam | ........... | H04L 41/5051 |
| | | | | 709/226 |
| 2016/0188445 A1* | 6/2016 | Hermeto | ............ | G06F 11/3684 |
| | | | | 714/38.1 |
| 2016/0256775 A1 | 9/2016 | Gustafson et al. | | |
| 2020/0036620 A1* | 1/2020 | Willshire | .............. | H04L 51/214 |
| 2020/0233780 A1* | 7/2020 | Kandru | ............... | G06F 11/3688 |
| 2020/0257616 A1* | 8/2020 | Padaki | ................ | G06F 11/3684 |
| 2020/0313999 A1* | 10/2020 | Lee | .................... | H04L 43/0847 |
| 2022/0023755 A1* | 1/2022 | Vukojevic | ............... | H04L 67/63 |
| 2023/0336452 A1* | 10/2023 | Augenstein | ......... | H04L 43/0852 |

OTHER PUBLICATIONS

Chandan Kumar, Speed Test IP and Data Center of Popular Hosting Provider, Jun. 14, 2022.

\* cited by examiner

METHOD AND SYSTEM FOR SELECTING DATA CENTERS BASED ON NETWORK METERING

TECHNICAL FIELD

This disclosure relates generally to data centers, and more particularly to a method and system for selecting data centers based on network metering.

BACKGROUND

In today's cloud adoption journey, almost every enterprises want to migrate or deploy one's workload in a cloud network data centers. However, selecting optimum data centers for deploying one's workload is a challenging task. Currently, the only option that the enterprises may have to select the data centers is based on distance from customer network location, availability of power, safety and security.

However, existing data center selection tools fail to provide network metering before deploying the workload on the cloud network data centers. At present the customer needs to wait for the deployment prior to metering the network using existing tools, but at that time a contract for the cloud deployment may be already signed. In other words, the customer may not know if moving to another region or to another hyperscaler would have resulted in better efficiency or cost-effectiveness.

Therefore, there exists a need to develop a method and system that provides solution to the aforementioned drawback.

SUMMARY

In one embodiment, a method of selecting one or more data centers based on a network metering is disclosed. In one example, the method may include rendering a user interface to enable a user to select at least one test plan from a plurality of test plans. Each of the plurality of test plans includes a list of target data centers on which the test is to be executed, a list of customer locations from where the test is to be executed, and one or more type of data packets to be employed as a part of test execution. The method may further include iteratively executing the at least one test plan selected by the user. The iterative execution of each of the at least one test plan may include, for each of the one or more type of data packets, transmitting a plurality of data packets between each of the customer locations and each of the target data centers. The iterative execution may further include metering a plurality of network parameters corresponding to each of the target data centers. The method may further include generating a test report in response to iterative execution of the at least one test plan. The method may further include providing a recommendation of the one or more data centers from the list of target data centers to the user based on the test report.

In another embodiment, a system of selecting one or more data centers based on a network metering is disclosed. In one example, the system may include a processor and a memory communicatively coupled to the processor. The memory store processor-executable instructions, which, on execution, cause the processor to render a user interface to enable a user to select at least one test plan from a plurality of test plans. Each of the plurality of test plans includes a list of target data centers on which the test is to be executed, a list of customer locations from where the test is to be executed, and one or more type of data packets to be employed as a part of test execution. The processor-executable instructions, on execution, further cause the processor to iteratively execute the at least one test plan selected by the user. The iterative execution of each of the at least one test plan may include transmitting, for each of the one or more type of data packets, a plurality of data packets between each of the customer locations and each of the target data centers. The iterative execution may further include metering a plurality of network parameters corresponding to each of the target data centers. The processor-executable instructions, on execution, further cause the processor to generate a test report in response to iterative execution of the at least one test plan. The processor-executable instructions, on execution, further cause the processor to provide a recommendation of the one or more data centers from the list of target data centers to the user based on the test report.

In yet another embodiment, a non-transitory computer-readable medium storing computer-executable instruction for selecting one or more data centers based on a network metering is disclosed. The stored instructions, when executed by a processor, may cause the processor to perform operations including rendering a user interface to enable a user to select at least one test plan from a plurality of test plans. Each of the plurality of test plans includes a list of target data centers on which the test is to be executed, a list of customer locations from where the test is to be executed, and one or more type of data packets to be employed as a part of test execution. The operations further include iteratively executing the at least one test plan selected by the user. The iterative execution of each of the at least one test plan may include, for each of the one or more type of data packets, transmitting a plurality of data packets between each of the customer locations and each of the target data centers. The iterative execution may further include metering a plurality of network parameters corresponding to each of the target data centers. The operations further include generating a test report in response to iterative execution of the at least one test plan. The operations further include providing a recommendation of the one or more data centers from the list of target data centers to the user based on the test report.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Further, the phrases "in some embodiments," "in accordance with some embodiments," "in the embodiments shown," "in other embodiments," and the like generally mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered as exemplary only, with the true scope and spirit being indicated by the following claims.

Figure 1:
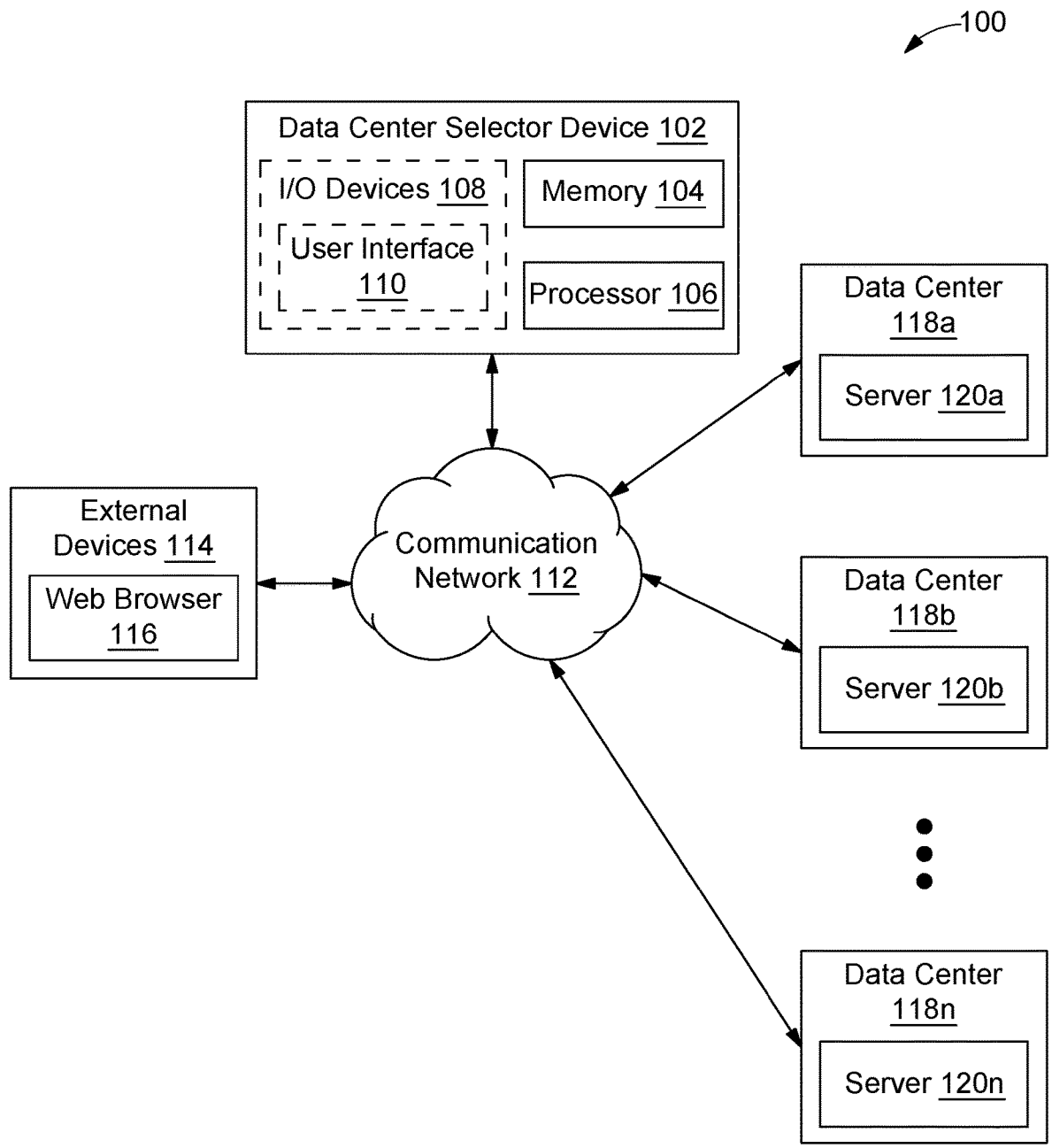
FIG. 1 is a block diagram of a system for selecting one or more data centers based on a network metering, in accordance with some embodiments of the present disclosure.

Referring now to FIG. 1, a block diagram of a system 100 for selecting one or more data centers based on a network metering is illustrated. The system 100 may include a data center selector device 102 that selects one or more data centers based on the network metering. In particular, the data center selector device 102 enables a user to select at least one test plan from a plurality of test plans. The data center selector device 102 may then iteratively execute the at least one test plan selected by the user. In response to iterative execution of the at least one test plan, the data center selector device 102 may generate a test report. Additionally, based on the test report, a recommendation of the one or more data centers from the list of target data centers may be provided to the user. Thus, the system 100 may resolve aforementioned problems by knowing in advance a best option to deploy one's workload. For example, the system may recommend one or more data centers to the user for deploying the workload and may further allow the user to access the recommendation and selection service from a customer network location. The customer network location may be one particular office or an average of entire ecosystem of branches. It should be noted that a user may be an employee (e.g., IT personnel) of a customer or an employee of IT service provider for the customer.

Examples of the data center selector device 102 may include, but are not limited to, a server, a desktop, a laptop, a notebook, a tablet, a smartphone, a mobile phone, an application server, or the like. The data center selector device 102 may include a memory 104, a processor 106, and input/output devices 108. The memory 104 may store instructions that, when executed by the processors 106, cause the processor 106 to select one or more data centers from the list of target data centers based on a network metering is illustrated, in accordance with some embodiments of the present invention. As will be described in greater detail in conjunction with FIG. 2 to FIG. 8, in order to select the one or more data centers, the processor 106 in conjunction with the memory 104 may perform various functions including selecting a test plan, iteratively executing the selected test plan, generating a test report based of iterative execution, and providing a recommendation of the one or more data centers to the user based on the test report.

The memory 104 may also store various data (e.g., data associated with test plans, list of target data centers, list of customer locations, one or more type of data packets, network parameters, test report, etc.) that may be captured, processed, and/or required by the data center selector device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.). The memory 104 may further include various modules that enable the data center selector device 102 to select one or more data centers. These modules are explained in detail in conjunction with FIG. 2.

The data center selector device 102 may interact with a user or an administrator via the input/output devices 108. In particular, the data center selector device 102 may interact with the user/administrator via a user interface 110 accessible via the display device (not shown). Thus, for example, in some embodiments, the data center selector device 102 may render the user interface 110 to enable the user to select at least one test plan from a plurality of test plans. Further, for example, in some embodiments, the data center selector device 102 may render results (e.g., recommended one or more data centers) to the user/administrator via the user interface 110. In some embodiments, the user/administrator may be authenticated to access the data center selector device 102 via the user interface 110.

In some embodiments, the data center selector device 102 may interact with one or more external devices 114 over a communication network 112 to iteratively execute the at least one test plan from customer locations. The one or more external devices 114 may include, but may not be limited to, a desktop, a laptop, a notebook, a netbook, a tablet, a smartphone, a remote server, a mobile phone, or another computing system/device. The one or more external devices 114 may include a web browser 116 that facilitate the user to iteratively execute the at least one test plan for metering a plurality of network parameters corresponding to each of the target data centers. Examples of the web browser 116 may include, but may not be limited to, a Microsoft Edge, an Internet Explorer, Google Chrome, a Mozilla Firefox, an Opera, or an Apple Safari. Moreover, the data center selector device 102 may share the metered network parameters to the user in a form of test report over one of these external devices 114 and further provide recommendation of the one or more data centers from the list of target data centers based on the test report. The communication network 112 may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

The system 100 may further include a plurality of target data centers (118*a*, 118*b* . . . 118*n*) and servers (120*a*, 120*b* . . . 120*n*) associated with each of the plurality of target data centers (118*a*, 118*b* . . . 118*n*). In some embodiments, the data center selector device 102 may interact with these servers, for example, the servers (120*a*, 120*b* . . . 120*n*) for sending/receiving various data. For example, in some embodiments, the data center selector device 102 may send the one or more type of data packets to each of the servers (120*a*, 120*b* . . . 120*n*) associated with the plurality of target data centers (118*a*, 118*b* . . . 118*n*) or may receive the metered network parameters for the one or more type of data packets from each of the servers (120*a*, 120*b* . . . 120*n*). Each of the servers (120*a*, 120*b* . . . 120*n*) is further communicatively coupled to a database (not shown), which may store the one or more type of data packets or the measured network parameters corresponding to each of the plurality of target data centers (118*a*, 118*b* . . . 118*n*).

Figure 2:
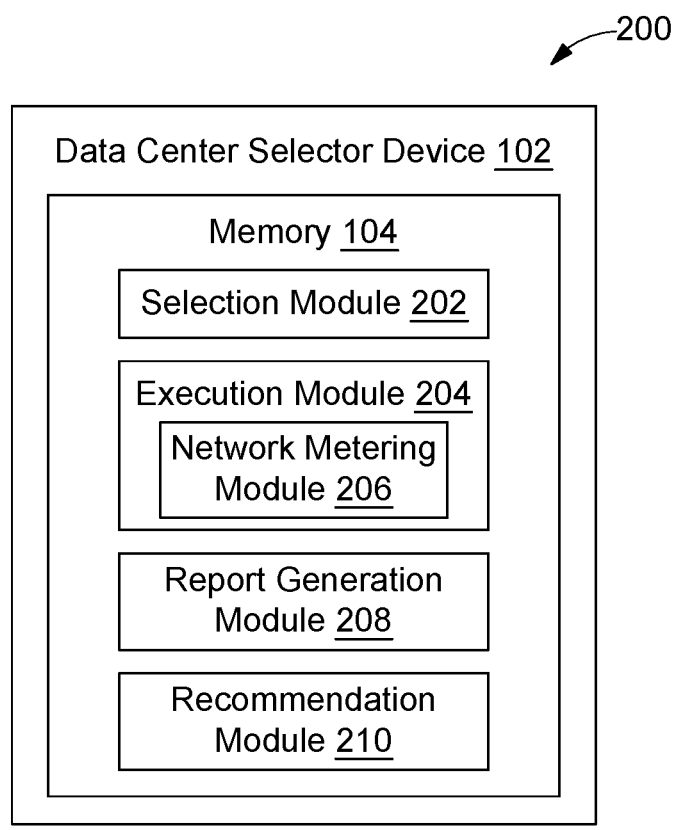
FIG. 2 is a block diagram illustrating various modules within a memory of a data center selector device configured to select one or more data centers, in accordance with some embodiments of the present disclosure.

Referring now to FIG. 2, a block diagram 200 of various modules within the memory 104 of the data center selector device 102 is illustrated, in accordance with some embodiments of the present disclosure. The memory 104 includes a selection module 202, an execution module 204, a network metering module 206, a report generation module 208, and a recommendation module 210. In order to select one or more data centers, initially, a user interface (analogous to the user interface 110 of FIG. 1) may be rendered to a user. The user may register and login into the user interface by providing login credentials.

Once the user logged into the user interface, the selection module 202 may enable the user to select at least one test plan from a plurality of test plans. It should be noted that each of the plurality of test plans may include a list of target data centers on which the test is to be executed, a list of customer locations from where the test is to be executed, and one or more type of data packets to be employed as a part of test execution. The one or more type of data packets may include a transactional data packet, a high download data packet, a high upload data packet, and a custom data packet.

Further, the execution module 204 may be configured to iteratively execute the at least one test plan selected by the user. More particularly, in some embodiments, the execution module 204 may execute the test plan over all the target data centers in the list of target data centers associated with the test plan. Alternatively, in some embodiments, the execution module 204 may execute the test plan only over target data centers selected by the user from the list of target data centers associated with the test plan.

For each of the one or more type of data packets, the execution module 204 may iteratively execute the at least one test plan by transmitting a plurality of data packets between each of the customer locations and each of the target data centers. Once the plurality of data packets gets transmitted, the network metering module 206 that is associated with the execution module 204 may be configured to meter a plurality of network parameters corresponding to each of the target data centers. The plurality of network parameters may include at least one of a transmission time, a download speed, and an upload speed of one or more types of data packets transmitted between each of the customer locations and each of the target data centers.

By way of an example, when the transactional data packet is employed as a part of test execution from the one or more type of data packets, then in that case the execution module 204 may iteratively execute the test plan by initially transmitting a plurality of small data packets between each of the customer locations and each of the target data centers. Upon transmission, the network metering module 206 associated with the execution module 204 may further meter a transmission time for each of the plurality of small data packets.

By way of another example, when employing the high download data packet as the part of test execution from the one or more type of data packets, then in that case the execution module 204 may iteratively execute the test plan by firstly transmitting one or more large data packets from each of the target data centers to each of the customer locations and then metering a download speed for each of the one or more large data packets through the network metering module 206.

By way of another example, when the high upload data packet from the one or more type of data packets is employed as the part of test execution, then in that case the execution module 204 may iteratively execute the test plan by transmitting one or more large data packets from each of the customer locations to each of the target data centers and then metering an upload speed for each of the one or more large data packets through the network metering module 206.

By way of another example, when the custom data packet from the one or more type of data packets is employed as the part of test execution, then in that case the execution module 204 may iteratively execute the test plan by transmitting one or more custom data packets between each of the customer locations and each of the target data centers and then metering a transmission time for each of the one or more custom data packets through the network metering module 206.

In response to iterative execution of the at least one test plan, the report generation module 208 may be configured to generate a test report. It should be noted that the test report may include the plurality of network parameters that is measured by the network metering module 206. For example, the test report may include the transmission time for each of the plurality of small data packets, the download speed for each of the one or more large data packets, the upload speed for each of the one or more large data packets, and the transmission time for each of the one or more custom data packets. Additionally, based on the test report, the recommendation module 210 may provide a recommendation of the one or more data centers from the list of target data centers to the user.

It should be noted that all such aforementioned modules 202-210 may be represented as a single module or a combination of different modules. Further, as will be appreciated by those skilled in the art, each of the modules 202-210 may reside, in whole or in parts, on one device or multiple devices in communication with each other. In some embodiments, each of the modules 202-210 may be implemented as dedicated hardware circuit comprising custom application-specific integrated circuit (ASIC) or gate arrays, off-the-shelf semiconductors such as logic chips, transistors, or other discrete components. Each of the modules 202-210 may also be implemented in a programmable hardware device such as a field programmable gate array (FPGA), programmable array logic, programmable logic device, and so forth. Alternatively, each of the modules 202-210 may be implemented in software for execution by various types of processors (e.g., processor 106). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

Figure 3:
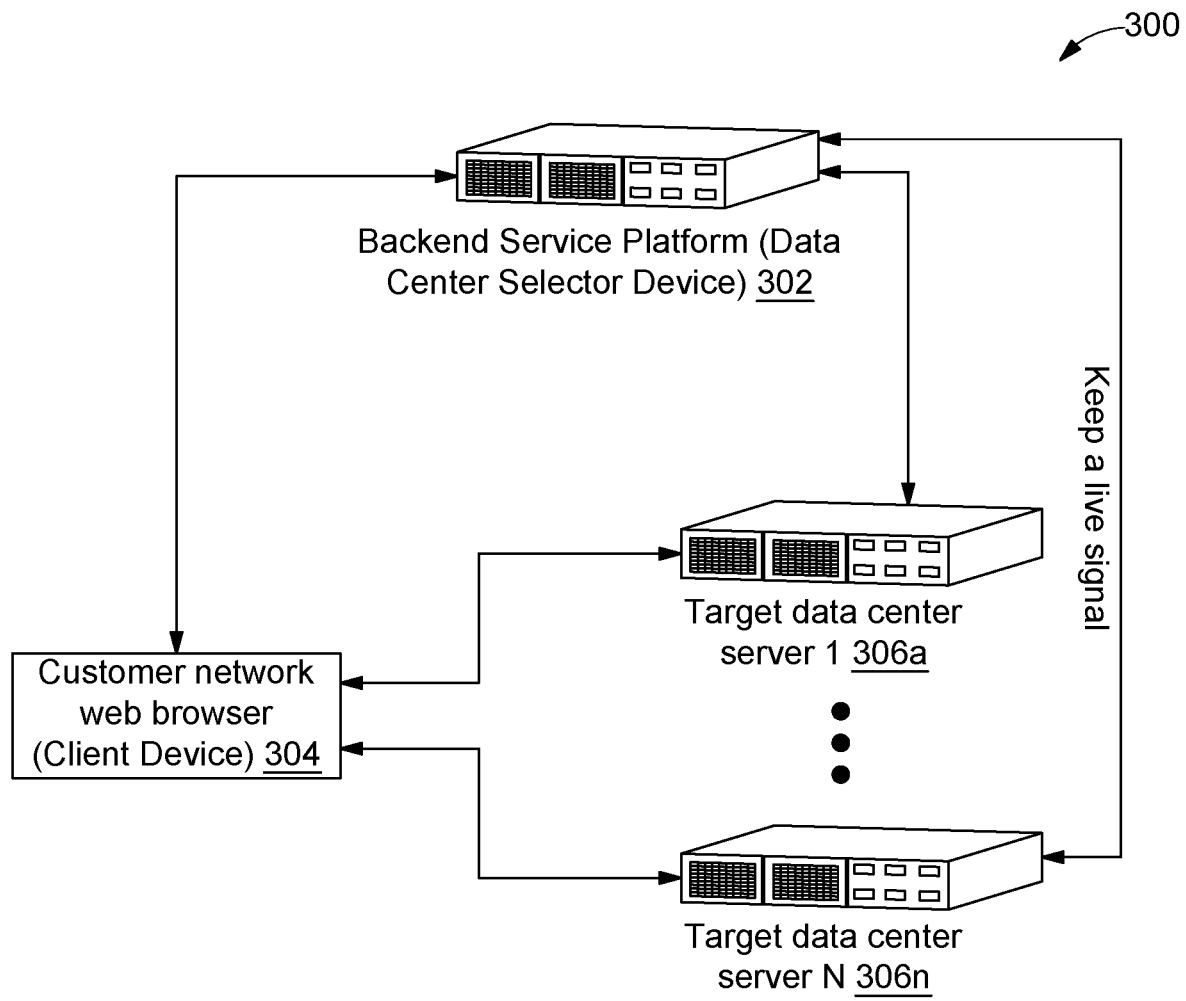
FIG. 3 illustrates an exemplary architecture for selecting one or more data centers based on network metering, in accordance with some embodiments of the present disclosure.

Referring now to FIG. 3, an exemplary architecture 300 for selecting one or more data centers based on network metering is illustrated, in accordance with some embodiments of the present disclosure. The exemplary architecture 300 may include a backend service platform 302, a customer network web browser 304 (analogous to the web browser 116 of FIG. 1), and a plurality of target data center servers (for example, a target data center server 1 306*a*, . . . and a target data center server N 306*n*, commonly referred to as 306).

As will be appreciated, the cloud network metering solution for selecting one or more data centers may be a web service that may be built in two layers—a client (i.e., the customer network web browser 304) that may send network requests to one or more backend servers (i.e., target data center servers 306) and may meter a response delay and throughput results, and backend service application (i.e., backend service platform 302) that may store test plans, result of the metering, test reports and so forth. It should be noted that the client may be one angular application or a HTML5/java script development. Further, it should be noted that the backend servers may be several physical little virtual machines deployed in each of the available target data centers of each hyperscaler, such as, but not limited to, AMAZON Web Services (AWS), GOOGLE Cloud Platform (GCP), or MICROSOFT Azure.

In order to select one or more suitable data centers for balancing customer's workload, initially a user needs to register and login into the backend service platform 302 through the customer network web browser 304. In some embodiments, the backend service platform 302 may be associated with the data center selector device 102. Upon logging into the backend service platform 302, the user may select at least one test plan from a plurality of test plan based on his preferences (i.e., customer preferences) via the customer network web browser 304. For example, the user may either perform full scan over the available target data centers, or only on a restricted list of the target data centers. It may be noted that an email address may be setup up of each of the user responsible for executing the at least one test plan from each of the customer location. This may help an administrator/customer to recognize an identity of the user executing the at least one test plan.

In some embodiments, the at least one test plan may be executed from the customer network web browser 304. At the time of executing the at least one test plan, the customer network web browser 304 may start sending or receiving a plurality of data packets against each of the target data center servers (for example, the target data center server 1 306*a*, . . . and the target data center server N 306*n*). The sending or receiving of the plurality of data packets may results in metering of a plurality of network parameters corresponding to each of the target data centers. It may be noted that in order to execute the at least one test plan from the backend service platform 302, a link or a Uniform Resource Locator (URL) may be received by the user, through the customer network web browser 304, that may include an (Internet Protocol) IP address of each of the target data centers on which the test is to be executed.

Upon execution, the plurality of metered network parameters may be uploaded in the backend service platform 302.

Based on the network metering, a test report may be generated. It will be apparent to a person skilled in the art that the test report may be in a (portable document format) PDF format and may be viewed or exported as per the customer needs via the customer network web browser 304. The test report may be offered in two versions. A first version may be a "certification version" in which a meter may only run from a device that renders the customer network web browser 304 against a particular hyperscaler or one or more selected target data centers in the test plan (i.e., a restricted result). The other version may be called an "explorer version" which means a long meter process with a customer client-side (i.e., multiple client devices) against all the available list of hyperscalers or the target data centers in the test plan (i.e., a full-blown result). Further, based on the test report, a recommendation of the one or more data centers from the list of target data centers may be provided to the user via the customer network web browser 304.

Figure 4:
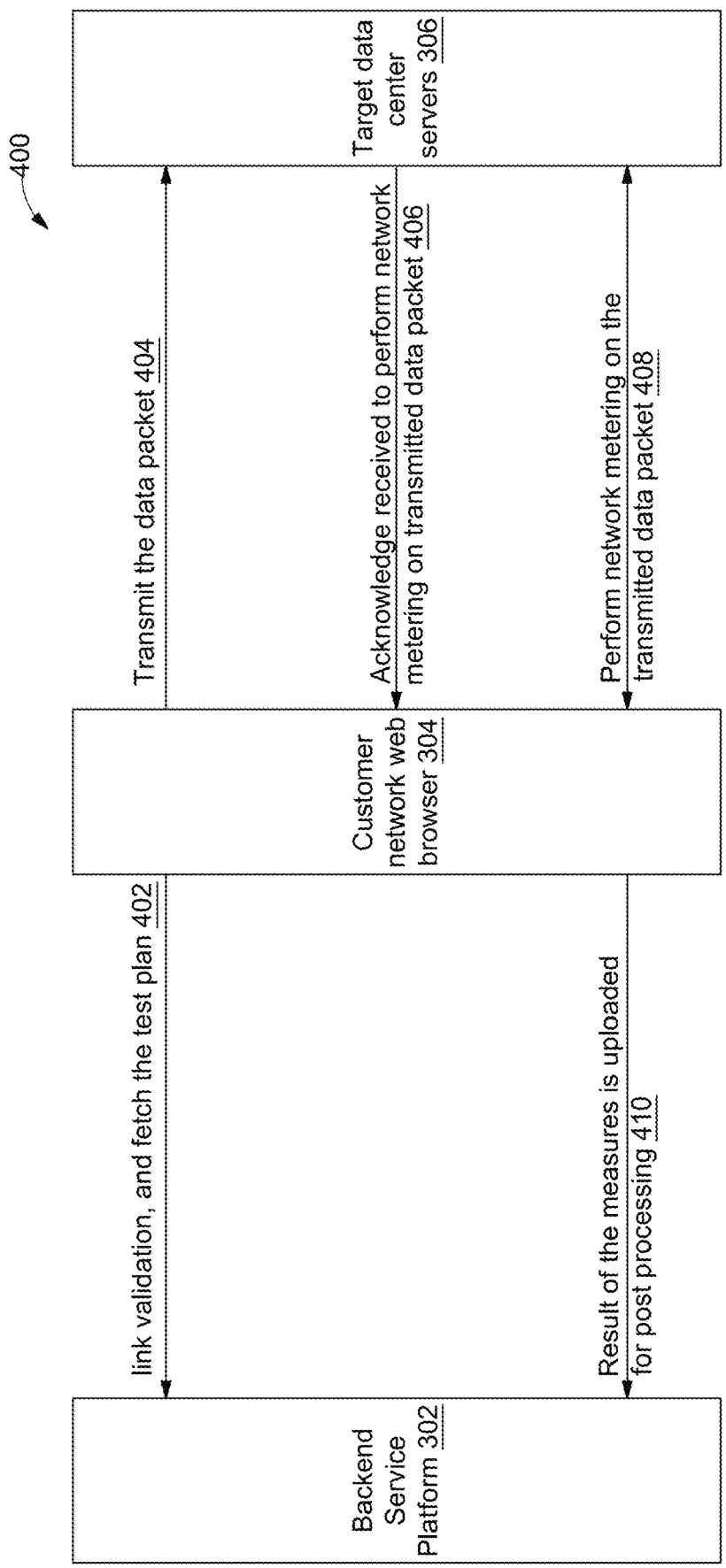
FIG. 4 illustrates an exemplary process flow for selecting one or more data centers based on network metering, in accordance with some embodiments of the present disclosure.

Referring now to FIG. 4, an exemplary process flow 400 for selecting one or more data centers based on network metering is illustrated, in accordance with some embodiments of the present disclosure. As mentioned earlier, in order to initiate the one or more data centers selection process, a user may first select at least one test plan from a plurality of test plans. Once the at least one test plan is selected by the user, then at step 402, a link may be shared with the user which may further be validated to provide an access to the data center selector device 102 for executing the at least one test plan. The link may include an IP address of each of the target data centers on which the test is to be executed. The user may further fetch the at least one test plan from the backend service platform 302 via the customer network web browser 304.

At step 404, the customer network web browser 304 may transmit one or more type of data packets to the target data center servers 306 for executing the at least one test plan. For example, the customer network web browser 304 may transmit a plurality of data packets (for example, a transactional data packet, a high download data packet, a high upload data packet, and a custom data packet) between each of the customer locations and each of the target data centers for metering a plurality of network parameters corresponding to each of the target data centers.

At step 406, an acknowledgement may be received to meter the plurality of network parameters for each of the plurality of data packets transmitted. Further, at step 408 the plurality of network parameters may be metered. Metering of the plurality on network parameters may include at least one of: metering a transmission time for each of the plurality of small data packets, metering a download speed for each of the one or more large data packets, metering an upload speed for each of the one or more large data packets, or metering a transmission time for each of the one or more custom data packets. It should be noted that the step 404 to step 408 may be iterated multiple times based on the test plan selected by the user.

Once the plurality of network parameters is metered, then at step 410, the plurality of network parameters may be uploaded to the backend service platform 302 for post processing. Once the test is completed, the execution link may become disabled and access to the same may redirect the user to a completed status message. It may be noted that the one or more type of data packets used to perform the test may be downloaded from the backend service platform 302 and may be either of a standard type or a special type according to the customer needs. However, as will be appreciate, same data packets must be used in all the tests in order to ensure a fair comparison (i.e., compare behavior of each of the plurality of the target data centers for same data packets).

Figure 5A:
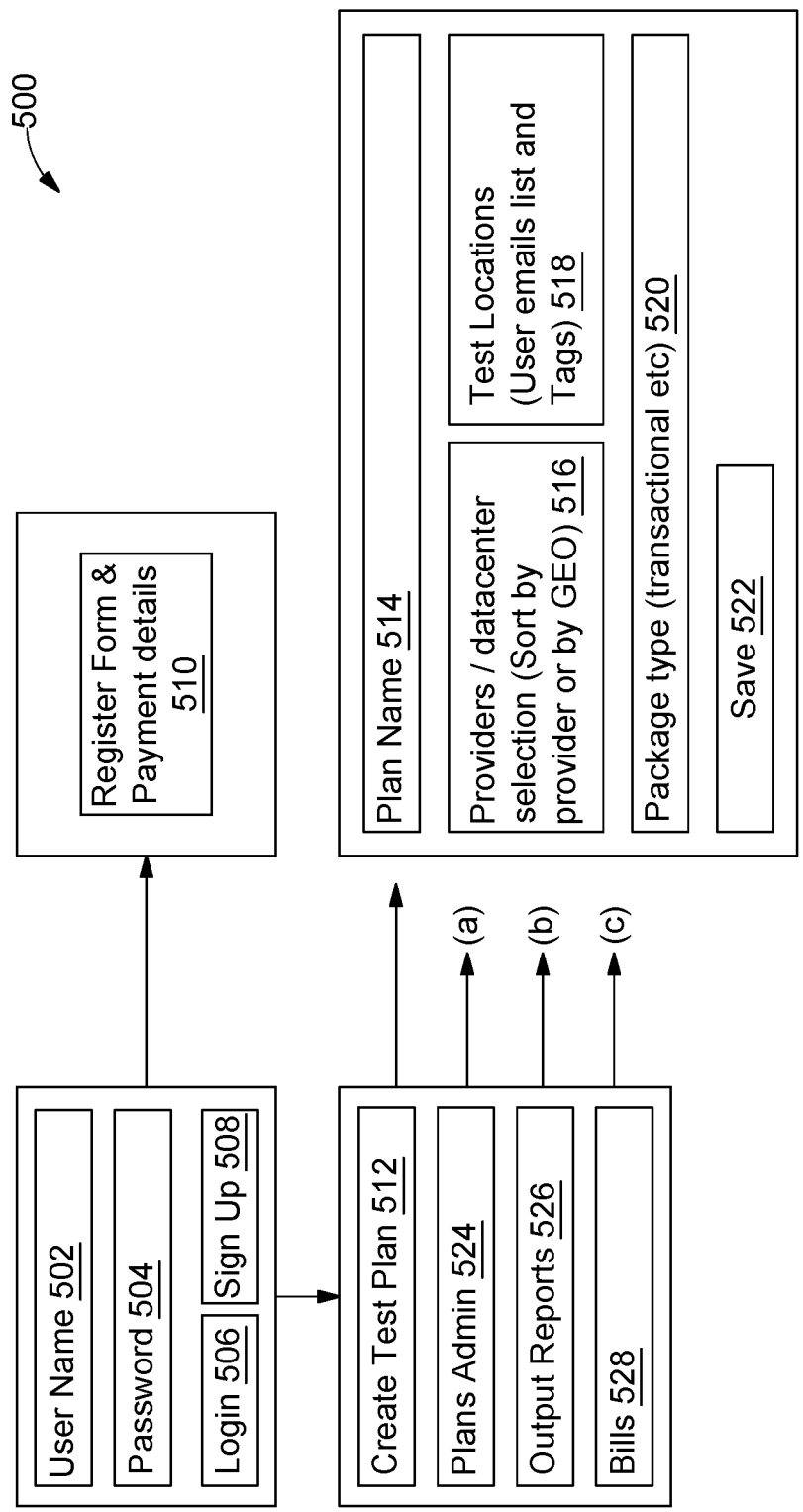
FIGS. 5A-5B illustrate an exemplary user interface of an application for selecting one or more data centers based on network metering, in accordance with some embodiments of the present disclosure.
Figure 5B:
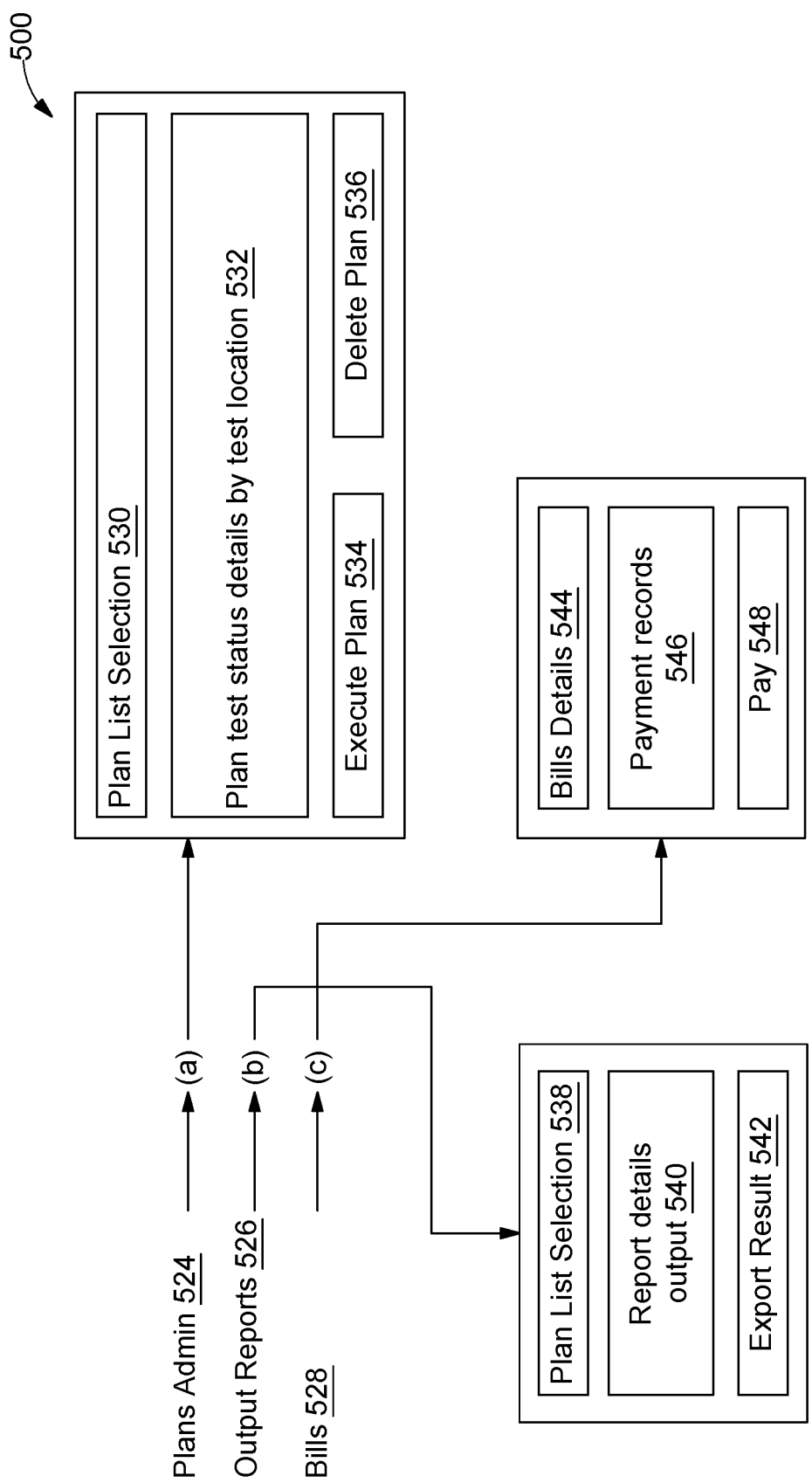

Referring now to FIGS. 5A-5B, an exemplary user interface 500 of an application for selecting one or more data centers based on network metering is illustrated, in accordance with some embodiments of the present disclosure. Initially, the user interface 500 of the application may be rendered to a user. In order to execute a test plan, the user may be required to login 506 into the application by providing a username 502 and a password 504. In an embodiment, new users may also access the application by using a signup 508 option in which the new users may register by filling a registration form 510 and providing payment details.

Once the user logs into the application, the user may be able to create a test plan by clicking on a create test plan 512 option. To create the test plan, the user may have to manually select a plan name 514, a list of target data centers 516 on which the test is to be executed, a list of customer locations 518 from where the test is to be executed, and one or more type of data packets 520 to be employed as a part of test execution. Upon creation of the test plan, the user may save their preferences by clicking on a save button 522.

The user interface 500 may further include options, for example, plans admin 524, output reports 526, and bills 528. As depicted in FIG. 5B, by clicking on the plans admin 524, the user may select at least one test plan 530 from a list of created test plans. Upon selection of the at least one test plan, the user may execute the at least one test plan by clicking on the execute plan button 534. The test plan status details may be depicted in a plan test status bar 532. It should be noted that the selected test plan is iteratively executed for different type of data packets to be employed as a part of test execution, for each of the customer location from where the test is to be executed, and for each of the target data centers on which the test is to be executed. The user may also have an option to delete the executed test plan history by clicking on a delete plan button 536.

In response to iterative execution of the at least one test plan, a test report may be generated. The user may access the generated test plan by clicking on the output reports 526 option. Upon clicking on the output reports 526, the user may select the executed test plan from a plan list selection 538 panel. Further, a test report details corresponding to the executed test plan may be shown to the user in a report details output bar 540. The user may also have an option to export test results by clicking on an export result button 542. Additionally, the user may also check their bills details 544 and payment records 546 by clicking on a play button 548 in the bills option 528 of the user interface 500.

Figure 6:
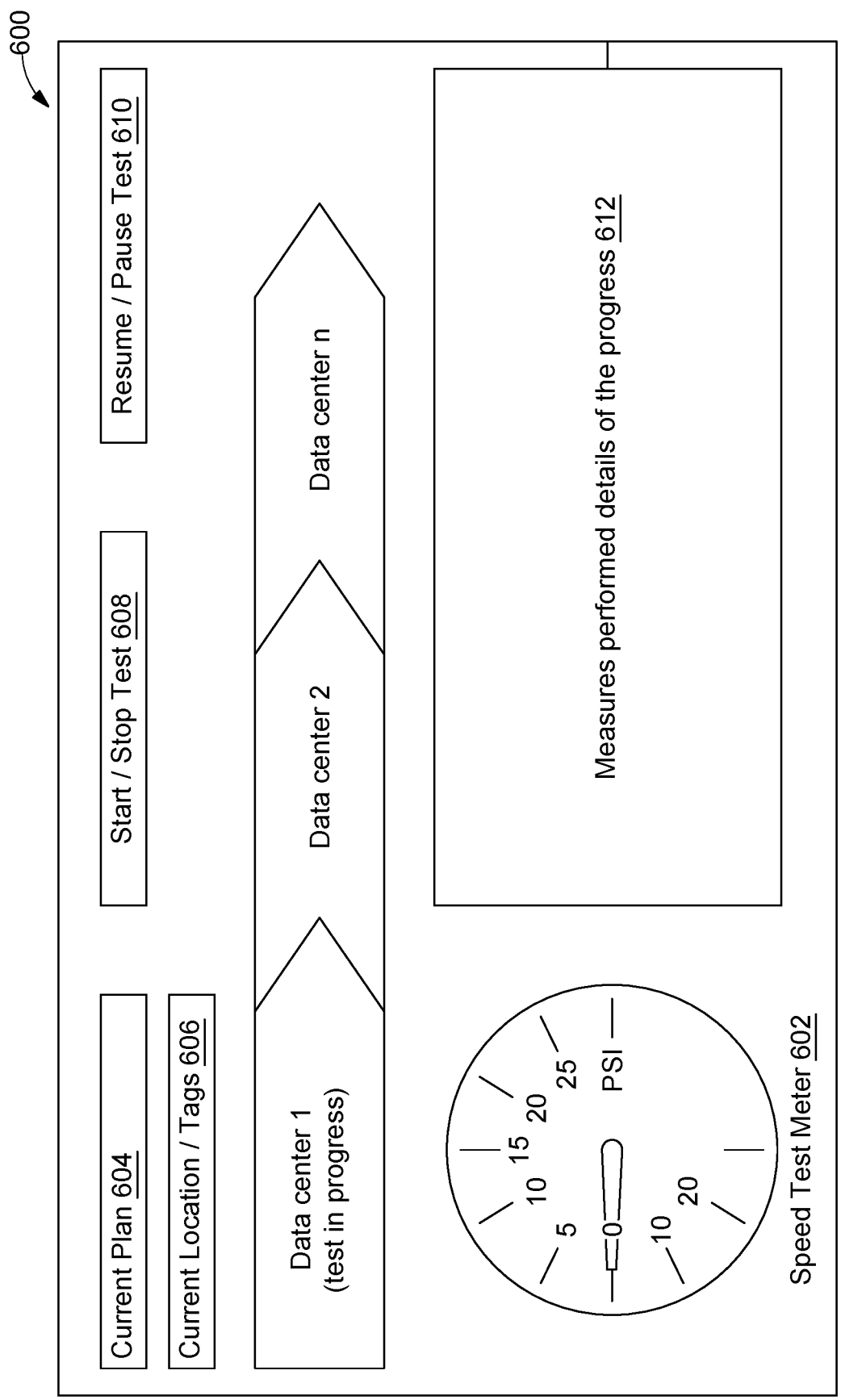
FIG. 6 illustrates an exemplary user interface of an application for selecting one or more data centers from a customer web browser, in accordance with some embodiments of the present disclosure.

Referring now to FIG. 6, an exemplary user interface 600 of an application for selecting one or more data centers from a customer web browser is illustrated, in accordance with some embodiments of the present disclosure. The user interface 600 depicts a speed test meter 602 for metering a test speed of each of the target data centers (for example, data center 1, data center 2, and data center n) on which the test is to be executed.

To initiate network metering, the user may first select the at least one test plan from a current plan window 604, a customer location from where the test is to be executed from a current location/tags window 606 and a list of target data centers on which the test is to be executed. Further, the user interface 600 may have options to start/stop the test plan from a start/stop test window 608, or resume/pause the test plan from the resume/pause window 610. Network parameters that may be measured via the speed test meter 602 may be visible to the user in a test measurement details window 612 which may be further shared with the user in the form of test report. Based on the execution of the test plan, a recommendation may be provided of the one or more data centers from the list of target data centers to the user. It should be noted that the complete process of executing the at least one test plan through the customer network web browser 304 for selecting the one or more data centers is already explained in detail in conjunction with FIG. 2 to FIG. 5.

As will be appreciated by one skilled in the art, a variety of processes may be employed for selecting one or more data centers based on a network metering. For example, the system 100 and the associated data center selector device 102 may select one or more data centers by the processes discussed herein. In particular, as will be appreciated by those of ordinary skill in the art, control logic and/or automated routines for performing the techniques and steps described herein may be implemented by the system 100 and the associated data center selector device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some, or all of the processes described herein may be included in the one or more processors on the system 100.

Figure 7:
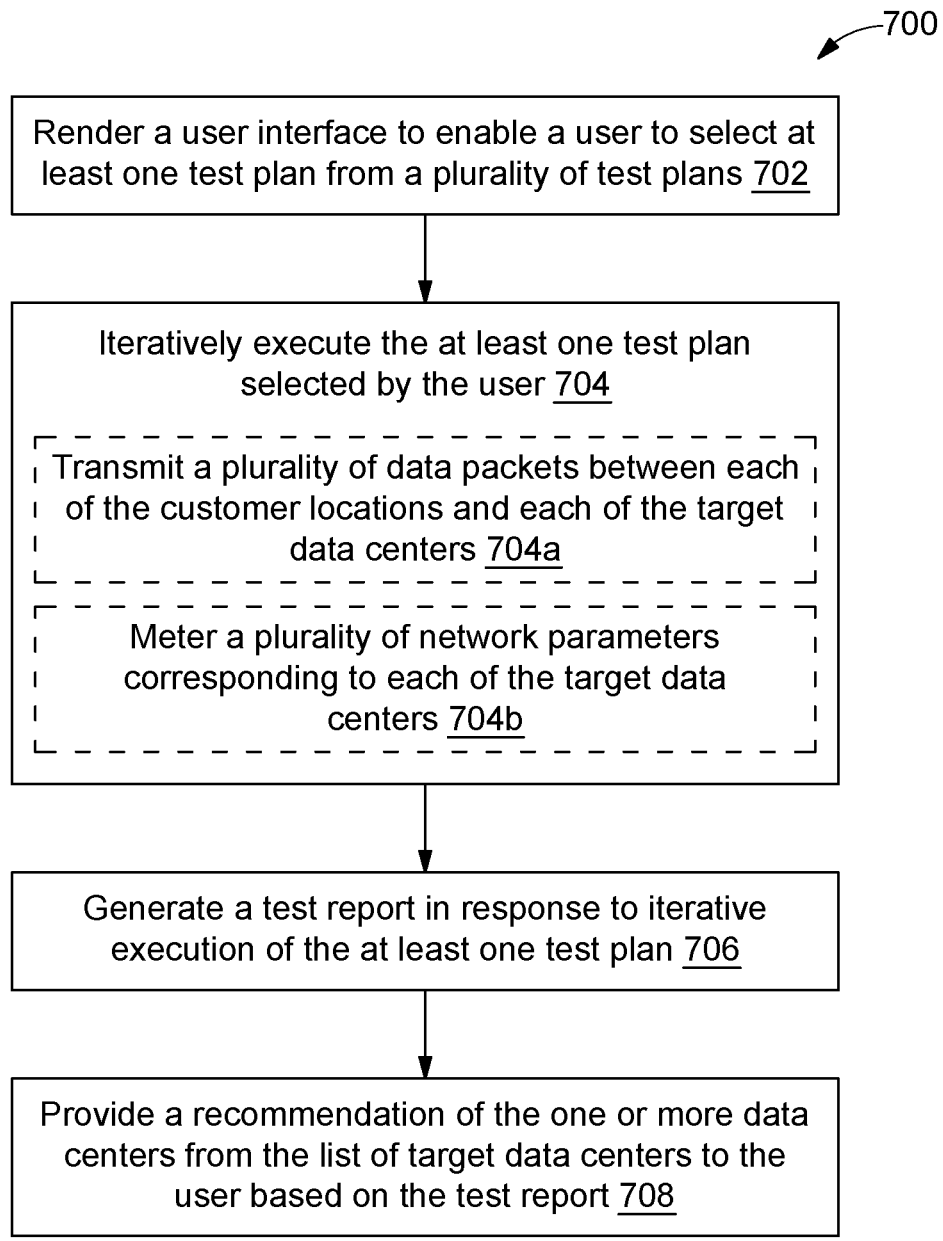
FIG. 7 is a flow diagram of a method of selecting one or more data centers based on a network metering, in accordance with some embodiments of the present disclosure.

Referring now to FIG. 7, a flow chart of a method 700 for selecting one or more data centers based on network metering is illustrated, in accordance with some embodiments of the present disclosure. All the steps 702-708 may be performed by the modules 202-210 of the data center selector device 102. At step 702, a user interface may be rendered to enable a user to select at least one test plan from a plurality of test plans. Each of the plurality of test plans may include a list of target data centers on which the test is to be executed, a list of customer locations from where the test is to be executed, and one or more type of data packets to be employed as a part of test execution. The one or more type of data packets may include a transactional data packet, a high download data packet, a high upload data packet, and a custom data packet.

At step 704, the at least one test plan selected by the user may be iteratively executed. For the iterative execution of each of the at least one test plan, the step 704 further includes a step 704a and a step 704b. At step 704a, for each of the one or more type of data packets, a plurality of data packets may be transmitted between each of the customer locations and each of the target data centers. At step 704b, a plurality of network parameters corresponding to each of the target data centers may be metered.

In some embodiments, for the transactional data packet type, the iteratively execution of the test plan includes transmitting a plurality of small data packets between each of the customer locations and each of the target data centers and metering a transmission time for each of the plurality of small data packets. In some embodiments, for the high download data packet type, the iteratively execution of the test plan includes transmitting one or more large data packets from each of the target data centers to each of the customer locations and metering a download speed for each of the one or more large data packets.

In some embodiments, for the high upload data packet type, the iteratively execution of the test plan includes transmitting one or more large data packets from each of the customer locations to each of the target data centers and metering an upload speed for each of the one or more large data packets. In some embodiments, for the custom data packet type, the iteratively execution of the test plan includes transmitting one or more custom data packets between each of the customer locations and each of the target data centers and metering a transmission time for each of the one or more custom data packets. The one or more custom data packets may include at least one of electronic file data packet provided by the user. The electronic file data packet may be one of a video data packet, an image data packet, an audio data packet, or a text data packet.

At step 706, a test report may be generated in response to iterative execution of the at least one test plan. It should be noted that the test report may include the transmission time for each of the plurality of small data packets, the download speed for each of the one or more large data packets, the upload speed for each of the one or more large data packets, and the transmission time for each of the one or more custom data packets transmitted during iteratively execution of the test plan. Further at step 708, a recommendation of the one or more data centers from the list of target data centers may be provided to the user based on the test report.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
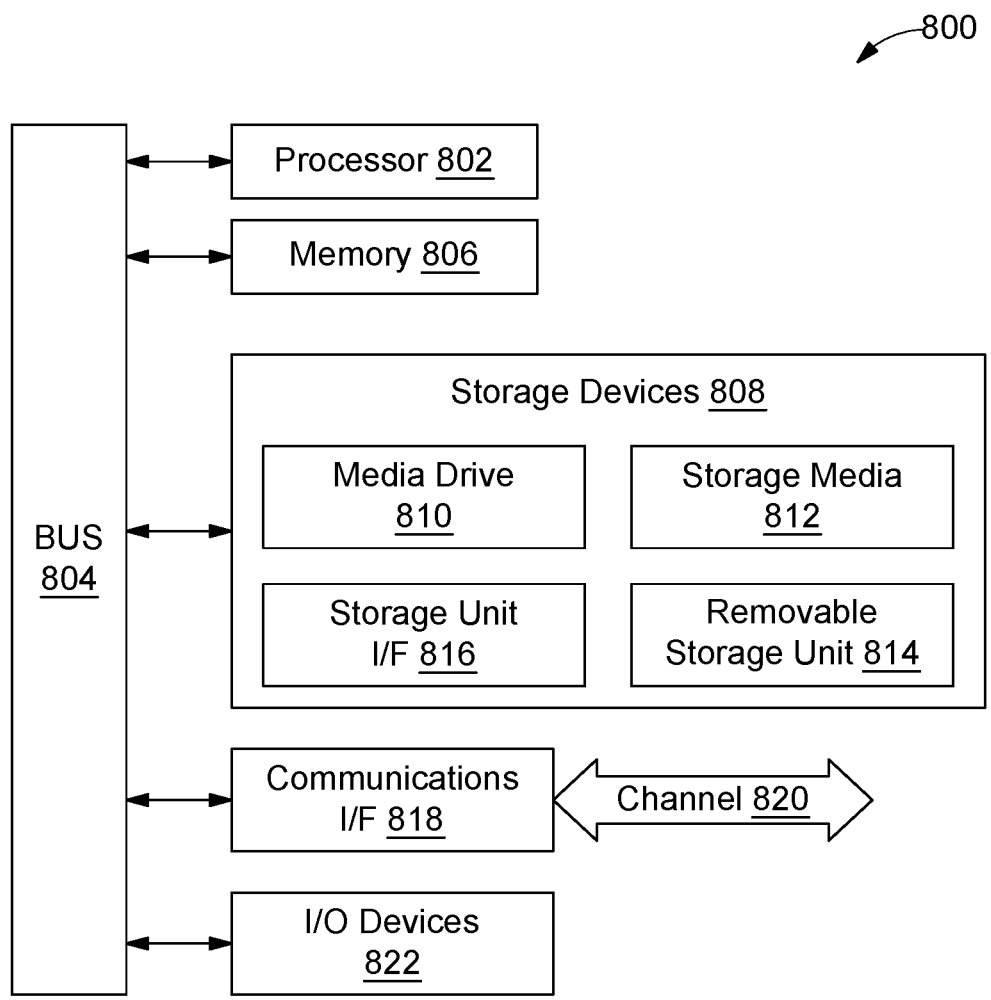
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, an exemplary computing system 800 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 800 may represent, for example, a user device such as a desktop, a laptop, a mobile phone, personal entertainment device, DVR, and so on, or any other type of special or general-purpose computing device as may be desirable or appropriate for a given application or environment. The computing system 800 may include one or more processors, such as a processor 802 that may be implemented using a general or special purpose processing engine such as, for example, a microprocessor, microcontroller or other control logic. In this example, the processor 802 is connected to a bus 804 or other communication medium. In some embodiments, the processor 802 may be an Artificial Intelligence (AI) processor, which may be implemented as a Tensor Processing Unit (TPU), or a graphical processor unit, or a custom programmable solution Field-Programmable Gate Array (FPGA).

The computing system 800 may also include a memory 806 (main memory), for example, Random Access Memory (RAM) or other dynamic memory, for storing information and instructions to be executed by the processor 802. The memory 806 also may be used for storing temporary variables or other intermediate information during execution of instructions to be executed by the processor 802. The computing system 800 may likewise include a read only memory ("ROM") or other static storage device coupled to bus 804 for storing static information and instructions for the processor 802.

The computing system 800 may also include a storage device 808, which may include, for example, a media drives 810 and a removable storage interface. The media drive 810 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 812 may include, for example, a hard disk, magnetic tape, flash drive, or other fixed or removable medium that is read by and written to by the media drive 810. As these examples illustrate, the storage media 812 may include a computer-readable storage medium having stored there in particular computer software or data.

In alternative embodiments, the storage devices 808 may include other similar instrumentalities for allowing computer programs or other instructions or data to be loaded into the computing system 800. Such instrumentalities may include, for example, a removable storage unit 814 and a storage unit interface 816, such as a program cartridge and cartridge interface, a removable memory (for example, a flash memory or other removable memory module) and memory slot, and other removable storage units and interfaces that allow software and data to be transferred from the removable storage unit 814 to the computing system 800.

The computing system 800 may also include a communications interface 818. The communications interface 818 may be used to allow software and data to be transferred between the computing system 800 and external devices. Examples of the communications interface 818 may include a network interface (such as an Ethernet or other NIC card), a communications port (such as for example, a USB port, a micro-USB port), Near field Communication (NFC), etc. Software and data transferred via the communications interface 818 are in the form of signals which may be electronic, electromagnetic, optical, or other signals capable of being received by the communications interface 818. These signals are provided to the communications interface 818 via a channel 820. The channel 820 may carry signals and may be implemented using a wireless medium, wire or cable, fiber optics, or other communications medium. Some examples of the channel 820 may include a phone line, a cellular phone link, an RF link, a Bluetooth link, a network interface, a local or wide area network, and other communications channels.

The computing system 800 may further include Input/Output (I/O) devices 822. Examples may include, but are not limited to a display, keypad, microphone, audio speakers, vibrating motor, LED lights, etc. The I/O devices 822 may receive input from a user and also display an output of the computation performed by the processor 802. In this document, the terms "computer program product" and "computer-readable medium" may be used generally to refer to media such as, for example, the memory 806, the storage devices 808, the removable storage unit 814, or signal(s) on the channel 820. These and other forms of computer-readable media may be involved in providing one or more sequences of one or more instructions to the processor 802 for execution. Such instructions, generally referred to as "computer program code" (which may be grouped in the form of computer programs or other groupings), when executed, enable the computing system 800 to perform features or functions of embodiments of the present invention.

In an embodiment where the elements are implemented using software, the software may be stored in a computer-readable medium and loaded into the computing system 800 using, for example, the removable storage unit 814, the media drive 810 or the communications interface 818. The control logic (in this example, software instructions or computer program code), when executed by the processor 802, causes the processor 802 to perform the functions of the invention as described herein.

Thus, the disclosed method and system try to overcome the technical problem of selecting one or more data centers based on network metering by knowing in advance the best option to deploy one workload in the cloud and consume the service from the customer network location of one particular office or the average of the entire ecosystems of branches. The disclosed method and system employ network metering for measuring a plurality of network parameters corresponding to each of the target data centers. The plurality of measured network parameters may help the user to select one or more optimal data centers from the list of the plurality of target data centers. Additionally, the disclosed method and system improves customer satisfaction during pre-sales cycle.

As will be appreciated by those skilled in the art, the techniques described in the various embodiments discussed above are not routine, or conventional or well understood in the art. The techniques discussed above may enable a customer to select data center as per his requirement. In particular, the techniques provide a recommendation on most efficient and cost-effective data centers for deploying the workload as per customer's requirement. Further, the techniques discussed above may allow the user to access the recommendation and select the recommended data centers from the customer network location, thereby making the process simple, time-saving, and convenient for enhanced decision making.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for managing a plurality of access points in a centralized wireless network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of selecting one or more data centers based on a network metering, the method comprising:
    rendering, by a data center selector device, a user interface to enable a user to select at least one test plan from a plurality of test plans, wherein each of the plurality of test plans includes a list of target data centers on which a test is to be executed, a list of customer locations from where the test is to be executed, and one or more types of data packets to be employed for the test;
    wherein the one or more types of data packets comprises a transactional data packet, a high download data packet, a high upload data packet, and a custom data packet, and
        wherein the custom data packet comprises an electronic file data packet provided by the user;
    iteratively executing, by the data center selector device, the at least one test plan selected by the user, wherein the iteratively executing the at least one test plan comprises:
        for each of the one or more types of data packets, transmitting a plurality of the one or more types of data packets between each of a plurality of customer locations from the list of customer locations and each of a plurality of data centers from the list of target data centers; and
        metering a plurality of network parameters corresponding to each of the plurality of data centers from the list of target data centers;
    displaying, by the data center selector device via the user interface, a test measurement details window,
        wherein the test measurement details window provides, in real-time, a metered value for each of the plurality of network parameters corresponding to the one or more data centers from the list of target data centers, and
        wherein the user interface enables the user to start, stop, resume, or pause the at least one test plan, based on a progress of the at least one test plan;

generating, by the data center selector device, a test report in response to the iteratively executing the at least one test plan;
iteratively executing the at least one test plan for the custom data packet type, comprising:
transmitting one or more custom data packets between each of the plurality of customer locations from the list of customer locations and each of the plurality of data centers from the list of target data centers;
metering a transmission time for each of the one or more custom data packets,
wherein the test report comprises the transmission time for each of the one or more custom data packets; and
providing, by the data center selector device, a recommendation of the one or more data centers from the list of target data centers to the user based on the test report.

2. The method of claim 1, further comprising authenticating the user for access to the data center selector device via the user interface.

3. The method of claim 1, wherein iteratively executing the test plan for the transactional data packet type comprises:
transmitting a plurality of small data packets between each of the plurality of customer locations from the list of customer locations and each of the plurality of data centers from the list of target data centers; and
metering a transmission time for each of the plurality of small data packets; and wherein the test report comprises the transmission time for each of the plurality of small data packets.

4. The method of claim 1, wherein iteratively executing the test plan for the high download data packet type comprises:
transmitting one or more large data packets from each of the plurality of data centers from the list of target data centers to each of the plurality of customer locations from the list of customer locations; and
metering a download speed for each of the one or more large data packets; and
wherein the test report comprises the download speed for each of the one or more large data packets.

5. The method of claim 1, wherein iteratively executing the test plan for the high upload data packet type comprises:
transmitting one or more large data packets from each of the plurality of customer locations from the list of customer locations to each of the plurality of data centers from the list of target data centers; and
metering an upload speed for each of the one or more large data packets; and
wherein the test report comprises the upload speed for each of the one or more large data packets.

6. A system of selecting one or more data centers based on a network metering, the system comprising:
a processor; and
a memory communicatively coupled to the processor, wherein the memory stores processor instructions, which when executed by the processor, cause the processor to:
render a user interface to enable a user to select at least one test plan from a plurality of test plans, wherein each of the plurality of test plans includes a list of target data centers on which a test is to be executed, a list of customer locations from where the test is to be executed, and one or more types of data packets to be employed for the test,
wherein the one or more types of data packets comprises a transactional data packet, a high download data packet, a high upload data packet, and a custom data packet, and
wherein the custom data packet comprises an electronic file data packet provided by the user;
iteratively execute the at least one test plan selected by the user, wherein the iterative execution of each of the at least one test plan comprises:
for each of the one or more types of data packets, transmitting a plurality of the one or more types of data packets between each of a plurality of customer locations from the list of customer locations and each of a plurality of data centers from the list of target data centers; and
meter a plurality of network parameters corresponding to each of the plurality of data centers from the list of target data centers; display a test measurement details window,
wherein the test measurement details window provides, in real-time, a metered value for each of the plurality of network parameters corresponding to the one or more data centers from the list of target data centers, and
wherein the user interface enables the user to start, stop, resume, or pause the at least one test plan, based on a progress of the at least one test plan;
generate a test report in response to iterative execution of the at least one test plan,
iteratively execute the at least one test plan for the custom data packet type, which comprises:
transmitting one or more custom data packets between each of the plurality of customer locations from the list of customer locations and each of the plurality of data centers from the list of target data centers;
metering a transmission time for each of the one or more custom data packets,
wherein the test report comprises the transmission time for each of the one or more custom data packets; and
provide a recommendation of the one or more data centers from the list of target data centers to the user based on the test report.

7. The system of claim 6, wherein the processor instructions, when executed by the processor, further cause the processor to authenticate the user for access to the data center selector device via the user interface.

8. The system of claim 6, wherein to iteratively execute the test plan for the transactional data packet type, the processor instructions, when executed by the processor, further cause the processor to:
transmit a plurality of small data packets between each of the plurality of customer locations from the list of customer locations and each of the plurality of data centers from the list of target data centers; and
meter a transmission time for each of the plurality of small data packets; and
wherein the test report comprises the transmission time for each of the plurality of small data packets.

9. The system of claim 6, wherein to iteratively execute the test plan for the high download data packet type, the processor instructions, when executed by the processor, further cause the processor to:
transmit one or more large data packets from each of the plurality of data centers from the list of target data centers to each of the plurality of customer locations from the list of customer locations; and meter a download speed for each of the one or more large data packets; and wherein the test report comprises the download speed for each of the one or more large data packets.

10. The system of claim 6, wherein to iteratively execute the test plan for the high upload data packet type, the processor instructions, when executed by the processor, further cause the processor to:

transmit one or more large data packets from each of the plurality of customer locations from the list of customer locations to each of the plurality of data centers from the list of target data centers; and meter an upload speed for each of the one or more large data packets; and wherein the test report comprises the upload speed for each of the one or more large data packets.

11. A computer program product for selecting one or more data centers based on a network metering, the computer program product being embodied in a non-transitory computer readable storage medium of a data center selector device and comprising computer instructions for:

rendering a user interface to enable a user to select at least one test plan from a plurality of test plans, wherein each of the plurality of test plans includes a list of target data centers on which a test is to be executed, a list of customer locations from where the test is to be executed, and one or more types of data packets to be employed for the test, wherein the one or more types of data packets comprises a transactional data packet, a high download data packet, a high upload data packet, and a custom data packet, and wherein the custom data packet comprises an electronic file data packet provided by the user;

iteratively executing the at least one test plan selected by the user, wherein the iteratively executing the at least one test plan comprises:

for each of the one or more types of data packets, transmitting a plurality of the one or more types of data packets between each of a plurality of customer locations from the list of customer locations and each of a plurality of data centers from the list of target data centers; and metering a plurality of network parameters corresponding to each of the plurality of data centers from the list of target data centers;

displaying, via the user interface, a test measurement details window, wherein the test measurement details window provides, in real-time, a metered value for each of the plurality of network parameters corresponding to the one or more data centers from the list of target data centers and wherein the user interface enables the user to start, stop, resume, or pause the at least one test plan, based on a progress of the at least one test plan;

generating a test report in response to iterative execution of the at least one test plan;

iteratively executing the at least one test plan for the custom data packet type, comprising:

transmitting one or more custom data packets between each of the plurality of customer locations from the list of customer locations and each of the plurality of data centers from the list of target data centers;

metering a transmission time for each of the one or more custom data packets, wherein the test report comprises the transmission time for each of the one or more custom data packets; and providing a recommendation of the one or more data centers from the list of target data centers to the user based on the test report.

12. The computer program product of claim 11, wherein the computer instructions further configured for iteratively executing the test plan for the transactional data packet type by:

transmitting a plurality of small data packets between each of the plurality of customer locations from the list of customer locations and each of the plurality of data centers from the list of target data centers; and metering a transmission time for each of the plurality of small data packets; and wherein the test report comprises the transmission time for each of the plurality of small data packets.

13. The computer program product of claim 11, wherein the computer instructions further configured for iteratively executing the test plan for the high download data packet type by:

transmitting one or more large data packets from each of the plurality of data centers from the list of target data centers to each of the plurality of customer locations from the list of customer locations; and metering a download speed for each of the one or more large data packets; and wherein the test report comprises the download speed for each of the one or more large data packets.

14. The computer program product of claim 11, wherein the computer instructions further configured for iteratively executing the test plan for the high upload data packet type by:

transmitting one or more large data packets from each of the plurality of customer locations from the list of customer locations to each of the plurality of data centers from the list of target data centers; and metering an upload speed for each of the one or more large data packets; and wherein the test report comprises the upload speed for each of the one or more large data packets.

* * * * *